(12) United States Patent
Martins et al.

(10) Patent No.: US 7,782,939 B2
(45) Date of Patent: *Aug. 24, 2010

(54) REAL TIME BIT RATE CONTROL SYSTEM

(75) Inventors: Fernando C. M. Martins, Hillsboro, OR (US); Rajeeb Hazra, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1579 days.

This patent is subject to a terminal disclaimer.

(21) Appl. No.: 11/044,661

(22) Filed: Jan. 27, 2005

(65) Prior Publication Data

US 2005/0190835 A1    Sep. 1, 2005

Related U.S. Application Data

(63) Continuation of application No. 09/216,184, filed on Dec. 18, 1998, now Pat. No. 6,850,565.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.03
(58) Field of Classification Search ............ None
See application file for complete search history.

(56) References Cited

U.S. PATENT DOCUMENTS

| | | | |
|---|---|---|---|
| 4,951,140 A | 8/1990 | Ueno et al. | |
| 5,150,432 A | 9/1992 | Ueno et al. | |
| 5,629,779 A * | 5/1997 | Jeon | 382/239 |
| 5,729,295 A | 3/1998 | Okada | |
| 5,790,196 A | 8/1998 | Sun et al. | |
| 5,801,779 A * | 9/1998 | Uz et al. | 375/240.24 |
| 5,815,601 A | 9/1998 | Katata et al. | |
| 5,819,004 A | 10/1998 | Azadegan et al. | |
| 5,832,115 A | 11/1998 | Rosenberg | |
| 6,023,296 A | 2/2000 | Lee et al. | |
| 6,850,565 B2 | 2/2005 | Martins et al. | |

* cited by examiner

*Primary Examiner*—Nhon T Diep
(74) *Attorney, Agent, or Firm*—Schwegman, Lundberg & Woessner, P.A.

(57) ABSTRACT

A source model in combination with an interest structure is provided to generate a quantization value for use in encoding a video signal. The interest structure is generated from a region of interest manually identified by a user viewing the video on an interactive user display or automatically by a system which recognizes the regions of interest automatically. The region of interest in the video signal is encoded using a quantization value calculated from the interest structure in combination with the source model, and the region of interest is encoded at a higher resolution level than surrounding regions.

7 Claims, 3 Drawing Sheets

REAL TIME BIT RATE CONTROL SYSTEM

RELATED APPLICATION(S)

This application is a Continuation of U.S. application Ser. No. 09/216,184 filed on Dec. 18, 1998 now U.S. Pat. No. 6,850,565 which is incorporated herein by reference.

FIELD OF THE INVENTION

This invention relates to video encoding, and more particularly to a bit rate control system for a video encoder.

BACKGROUND OF THE INVENTION

With the availability of high bandwidth communication channels, real time video communication systems are becoming more common. For example, a real time video system connecting Seattle and Sioux Falls enables a surgeon in Seattle to view heart surgery taking place in an operating room in Sioux Falls. A video camera in Sioux Falls captures and transmits the compressed video signal over a high bandwidth channel to Seattle. The video signal is decoded and displayed for viewing by the surgeon. In this scenario, the amount of detail in the displayed image depends on the resolution of the video camera, the bandwidth of the channel, and the power of the processor decoding and displaying the video.

A problem with this system is that a viewer of the video, the surgeon in the scenario just described, may desire to selectively increase the detail in an area of the displayed video. One solution to this problem is to have a separate camera and channel for transmitting an image of the desired area of detail. This solution introduces two problems. First, the solution is expensive, since a separate video system and channel for transmitting a separate high resolution image doubles the cost of capture, transport, and display of the desired image. Second, the transmitted high resolution image is not integrated with the original image, which leads to user interface problems on both ends of the communication channel.

In the low bandwidth world, real time video systems have been in use for many years. For example, real time video conference systems are in regular use in corporations and universities. In these organizations, video conference systems are used when it is important to have face-to-face communication between people located in different places, but travel is not practical. A problem with video conference systems is that the video is not sharp because the systems operate at low data rates. There are two traditional approaches to improving sharpness, but each has drawbacks. One approach is to reduce the number of pixels per frame in order to increase the number of bits available to encode each pixel. With this approach each pixel will look sharper, but each pixel will also correspond to a larger region of the image, which translates into reduced spatial resolution in the image. A second approach is to reduce the frame rate (frames per second) to increase the number of bits available to encode each individual frame. With this approach the individual images will be sharper, but perceptually, the motion will appear to be jerkier.

For these and other reasons there is a need for the present invention.

SUMMARY OF THE INVENTION

A real time bit rate control system is described. In one embodiment a bit rate control system includes an interest structure and a source model. The source model is scaled by the interest structure to generate a quantization value for use in encoding a macroblock. Still other embodiments, aspects and advantages of the invention are described in the following detailed description.

DETAILED DESCRIPTION OF THE INVENTION

In the following detailed description of the preferred embodiments, reference is made to the accompanying drawings which form a part hereof, and in which are shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Video systems can generate and transmit video information in different modes, such as raw video or compressed video. Transmission of raw video requires a wide bandwidth transmission channel, so in most applications compressed video, which requires a narrower bandwidth transmission channel, is needed. In a compressed video system, frames can be transmitted as predicted frames, P frames, or intra frames, I frames. A predicted frame is generated from the difference between the current frame and a motion compensated version of a previously encoded frame, while an intra frame is generated from the current frame alone. The information in the predicted frame is called residual information. The procedure for generating the residual information involves estimating the motion of areas within the frame, constructing a motion compensated version of the previous frame, and computing the difference with respect to the current frame. This procedure is sometimes called motion-compensated prediction. Motion compensation systems compensate for translation in the vertical and horizontal directions, to further reduce the residual information content. This compensation is not perfect when objects move freely in three dimensions, and the prediction error is encoded as residual information. The residual information is compacted via a transform such as the discrete cosine transform. The transform coefficients obtained are quantized and encoded before transmission.

Figure 1:
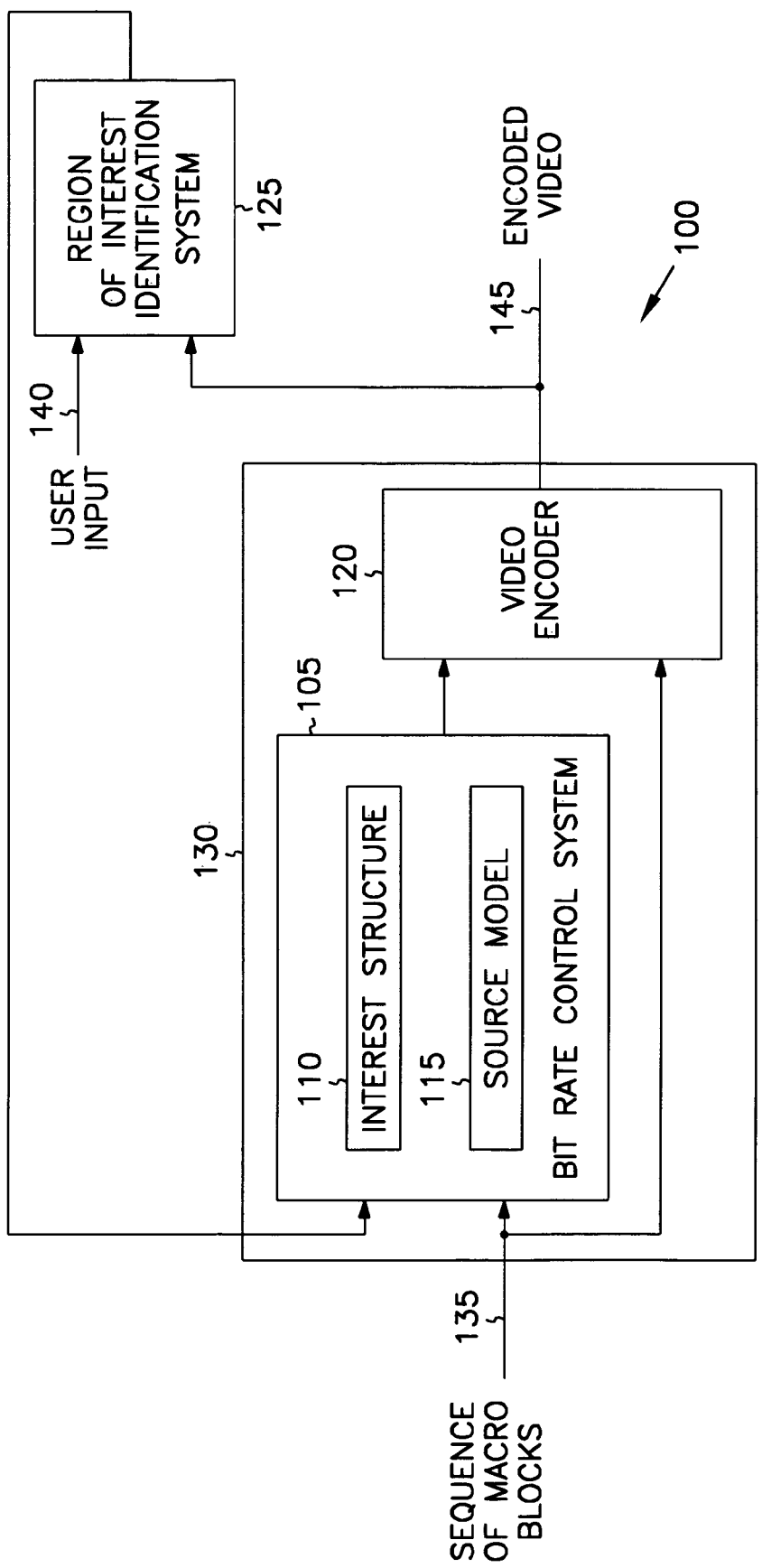
FIG. 1 is a block diagram of one embodiment of an apparatus for the practice of the present invention.

FIG. 1 is a block diagram of one embodiment of an apparatus for the practice of the present invention. System 100 comprises bit rate control system 105 including interest structure 110 and source model 115, video encoder 120, region of interest identification system 125, and processor 130. Bit rate control system 105 and video encoder 120 run on processor 130. Bit rate control system 105 is coupled to video encoder 120, video encoder 120 is coupled to region of interest identification system 125, and region of interest identification system 125 is coupled to bit rate control system 105. Sequence of macroblocks 135 is an input to control system 105; user input 140 is an input to region of interest identification system 125; and encoded video 145 is an output of video encoder 120.

Bit rate control system 105 modulates video quality spatially by selecting quantizers that ensure the bandwidth of encoded video 145 does not exceed the bandwidth of the communication channel over which encoded video 145 is transmitted. Selecting quantizers that generate encoded video frames that exceed the bandwidth of the communication channel causes frames to be skipped, which ultimately results in a variable frame rate and jerky motion in the decoded video.

Bit rate control system 105 includes interest structure 110 and source model 115. Bit rate control system 105 generates quantizers on a macroblock basis in order to selectively control the video quality across a video frame. Interest structure 110, such as an interest matrix, defines the relative importance of each macroblock in a frame by associating each element in the matrix with a macroblock and by assigning each element in the matrix a numerical value indicating its relative importance.

The interest matrix M cooperates with source model 115 and parameters $X_1$ and $X_2$ as described in equation (1).

$$M_i R_i = X_2 \frac{\sigma_i}{Q_i^2} + X_1 \frac{\sigma_i}{Q_i} \quad (1)$$

$R_i$ is described in equation (2).

$$R_i = \frac{R}{N} \quad (2)$$

$X_1$ and $X_2$ are parameters that are updated according to equations (3) and (4), respectively.

$$X_1 = X_1 + 2\mu \Delta R_i \sigma_i / Q_i \quad (3)$$

$$X_2 = X_2 + 2\mu \Delta R_i \sigma_i / Q_i^2 \quad (4)$$

The variables in equations 1-4 of one embodiment of the present invention are described below.

M is an interest matrix for one embodiment, and $M_i$ is a dimensionless element of the interest matrix corresponding to the $i^{th}$ macroblock. Elements of the interest matrix are assigned numerical values that indicate the relative importance of each macroblock, and after normalization, which means that $$\sum_i M_i = N$$

for all i, the elements assume a value greater than zero. An important aspect of the interest matrix is that the elements should not assume a value of zero, to avoid persistent artifacts in the macroblocks.

The interest matrix element values for one embodiment are assigned based on the degree of interest associated with a macroblock. Interest associated with the macroblock is defined as the degree of resolution desired for that macroblock in the video image. The higher the degree of resolution desired in the region of the video image associated with the macroblock, the larger the value assigned to the corresponding element $M_i$. In operation, the interest matrix is formed using coordinates identified manually by a user or automatically by a hardware or software system. Bit rate control system 105 is independent of the method used to set up the interest matrix.

R is the target frame size for one embodiment and has the dimensions of bits. N is the number of macroblocks in a frame, and $R_i$ is the number of bits budgeted for the $i^{th}$ macroblock, assuming a uniform distribution of bits across the frame. Those skilled in the art will recognize that in order to avoid dropping frames and to ensure full use of the available bandwidth, the frame size is selected to be equal to the channel bandwidth divided by the video frame rate.

$\sigma_i$ is a dimensionless measure of the current macroblock activity for one embodiment. Those skilled in the art will recognize that several measures of macroblock activity, which are taken after motion compensation, such as heuristic motion estimation signatures, sum of weighted differences, sum of absolute differences, and variance after motion compensation, can be used to provide a measure of the current macroblock activity. For example, to calculate $\sigma_i$ using the sum of the absolute differences after motion compensation, the current and the previous motion compensated frames are partitioned into macroblocks. For each corresponding pair of macroblocks, a pixel-by-pixel difference is computed and the sum of the absolute value of the differences is computed. If there is no motion between the two frames, or if motion compensation is perfect, then the selected macroblocks are identical and the sum of the absolute differences is zero. If there is a small amount of non-compensated motion, then the sum of the absolute differences is small, and if there is a large amount of non-compensated motion, then the sum of the absolute differences is large. The sum of weighted differences is an approximation to the sum of absolute differences, and in one embodiment, the sum of weighted differences is a faster and more efficient method of calculation than the sum of absolute differences.

$\sigma_i$ and $M_i$ cooperate in one embodiment to modulate the number of bits used to encode a region of interest. For example, in an image of a person waving a hand, the region in which the hand is moving has lots of activity due to non-compensated motion and to ensure that the spatial quality of the video is maintained, more bits are required by the moving hand than by a stationary hand. So, $\sigma_i$ biases the hand waving region in favor of encoding more bits in equation (1). The interest matrix modulates the bit allocation such that macroblocks inside the region of interest receive more bits; so if the waving hand is in the region of interest, then $\sigma_i$ and $M_i$ cooperate to ensure that a finer quantizer is selected to produce better image quality for the relatively more important macroblocks in the area of the moving hand. If the waving hand is not in the region of interest, then $\sigma_i$ and $M_i$ will compete for bit allocation.

$Q_i$ for one embodiment is the quantization value used in video encoder 120 to encode sequence of macroblocks 135. $Q_i$ is calculated in bit rate control system 105 by solving equation (1) for $Q_i$.

$X_1$ and $X_2$ for one embodiment are the source model parameters and can be recalculated as often as desired. Frequent recalculation of $X_1$ and $X_2$ results in a smoothly rendered video image, and in distinct embodiments $X_1$ and $X_2$ are recalculated once per macroblock or once per frame, respectively. Initial values for $X_1$ and $X_2$ are computed by fitting the source model [equation (1)] to videos encoded with fixed quantizers.

$\Delta R_i$ for one embodiment is a difference in the number of bits actually used to encode the $i^{th}$ macroblock in a pair of adjacent frames.

$\mu$ for one embodiment is a dimensionless number between zero and one that tempers the update of $X_1$ and $X_2$. For example, if $\mu$ is zero, then $X_1$ and $X_2$ are not updated. If $\mu$ is 1, then $X_1$ and $X_2$ fit the data acquired to the current frame instantly. In one embodiment of the present invention μ is a very small number.

Those skilled in the art will recognize that a variety of source models can form a basis for different embodiments of the present invention. For example, the first term of the source model of equation (1) is a source model suitable for use in an embodiment of the present invention, and a rate-constrained source model is also suitable for use in an embodiment of the present invention.

Video encoder 120 processes sequence of macroblocks 135 to generate encoded video 145, which contains fewer bits than contained in sequence of macroblocks 135. For example, in one embodiment video encoder 120 applies a discrete cosine transform, followed by a quantizer, a run length encoder, and a variable length encoder to sequence of blocks 135 to generate encoded video 145.

In one embodiment of the present invention a real time video communications system encodes video giving special emphasis to one or more predefined regions of interest. For example, region of interest identification system 125 receives encoded video 145 from video encoder 120 and generates region of interest information for bit rate control system 105. In one embodiment region of interest identification system 125 is an interactive user display coupled to video encoder 120 and bit rate control system 125, which permits a user to view encoded video 145 and to identify regions of interest through user input 140 of the interactive display to bit rate control system 105. In one embodiment, the user identifies regions of interest directly through user input 140. The regions of interest, as described above, permit bit rate controller 105 to allocate the available bandwidth to the regions of greatest interest, while preserving the overall data rate from one frame to the next. Regions that a user identifies for high resolution receive more bits for encoding than regions that the user identifies for low resolution.

In an alternate embodiment, the region of interest is automatically identified from encoded video 145 by region of interest identification system 125. For example, in a system that is designed for tracking human faces or other moving objects, motion information is extracted from encoded video 145. Information extracted includes a coordinate position of the center of the face or other moving object, the center of mass of the face or other moving object, and the radius of the face or other moving object in the image. With that information defining the region of interest, the interest matrix is produced. For example, for one embodiment everything that is inside the region of interest gets a value close to one for $M_i$, everything that is close to the boundary gets a value close to one-half, and everything else gets a value of one-tenth.

Processor 130 provides a computing platform on which bit rate control system 105 and video encoder 120 can operate. A processor suitable for practicing embodiments of the present invention is one that is suitable for video processing. For example, a thirty-two bit processor operating at 450 megahertz is suitable for use in practicing embodiments of the present invention.

In summary, for one embodiment bit rate control system 105 processes sequence of macroblocks 135 to generate a quantizer $Q_i$. $Q_i$ is calculated from a source model in combination with an interest matrix. The area of interest in the encoded video is identified to bit rate control system 105 by providing the interest matrix either manually or automatically through region of interest identification system 125. In bit rate control system 105, the source model in cooperation with the interest matrix is solved for $Q_i$, and $Q_i$ is provided to video encoder 120, which encodes macroblock sequence 135 as encoded video 145. When encoding intra macroblocks, a parallel source model parameter is maintained. For example, a separate set of parameters $X_1$ and $X_2$ are maintained.

Figure 2:
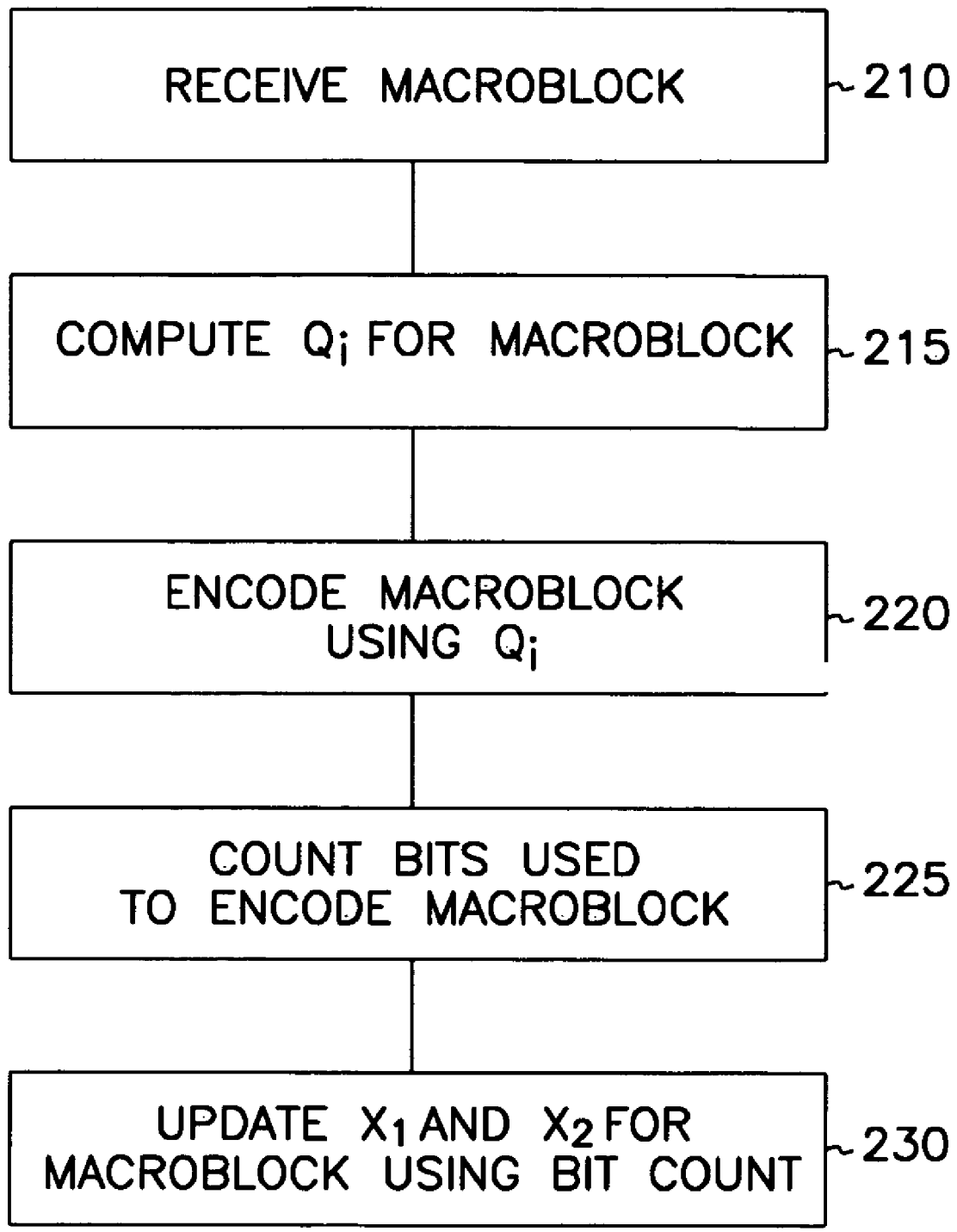
FIG. 2 is a flow diagram of one embodiment of a method of the present invention.

Referring to FIG. 2, a flow diagram for one embodiment of a method of the present invention is shown. After a macroblock is received as shown in block 210, $Q_i$ is computed for the macroblock, as shown in block 215. The received macroblock is encoded using $Q_i$ as a quantizer, as shown in block 220. The number of bits actually used to encode the macroblock are counted as shown in block 225. $X_1$ and $X_2$ are updated for the macroblock using the bit count, as shown in block 230.

Figure 3:
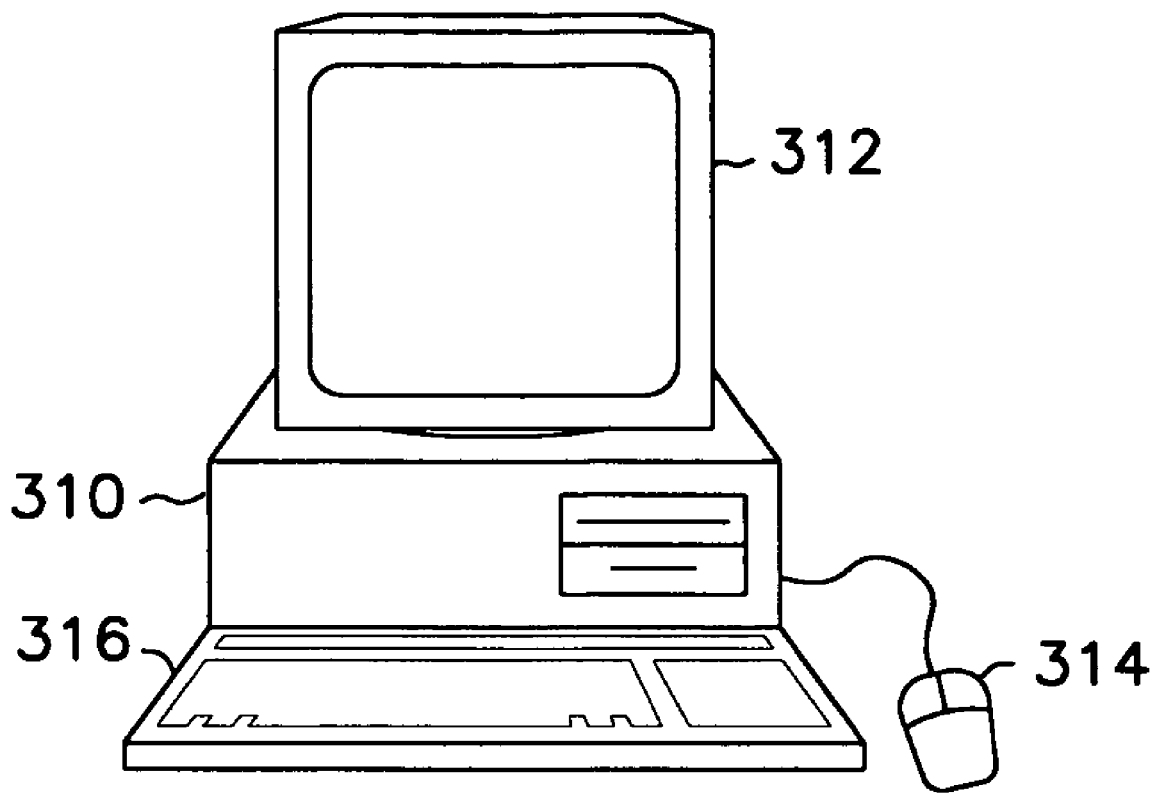
FIG. 3 is a diagram of a computer in conjunction with which embodiments of invention may be practiced.

A representative computer, in conjunction with which embodiments of the invention may be practiced, is now described. Those of ordinary skill within the art can appreciate, however, that the invention is not limited to implementation in conjunction with this computer. Referring to FIG. 3, a diagram of the computer in conjunction with which embodiments of the invention may be practiced is shown. Computer 310 is operatively coupled to monitor 312, pointing device 314, and keyboard 316. Computer 310 includes a processor, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interfaces. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A system comprising:
    a bit rate control system including a source model scaled by an interest structure to generate a quantization value for use in encoding a macroblock, the interest structure including an interest matrix having a plurality of entries, wherein each of the plurality of entries comprises a non-zero number corresponding to a macroblock, and none of the plurality of entries takes on a zero value, wherein the non-zero number comprises a number greater than zero;
    the bit rate control system including a sequence of macroblocks input operable to receive a sequence of macroblocks including the macroblock, and an output coupled to a video encoder operable to provide an encoded video output; and a region of interest identification system communicatively coupled to the bit rate control system, the region of interest identification system including a user input operable to receive one or more user inputs that identify a region of interest in a real time video communication generated from the encoded video output, the regional of interest identification system including an input to receive the transmitted encoded video, and an output coupled to the bit rate control system, wherein the output is operable to provide a region of interest information to the bit rate control system based on the one or more user inputs, wherein the bit rate control system is operable to determine a value for at least one of the plurality of entries based on the region of interest information.

2. The system of claim 1, wherein a radius of a moving object in the region of interest can be extracted.

3. The system of claim 2, wherein a coordinate position of the moving object in the region of interest can be extracted.

4. The system of claim 3, wherein a center of mass of the moving objection in the region of interest can be extracted.

5. The system of claim 4, wherein the radius, the coordinate position, and the center of mass is included in producing the interest matrix.

6. A system comprising:
a microprocessor host;
a bit rate control system run on the microprocessor host and including a source model scaled by an interest structure to generate a quantization value for use in encoding a macroblock, the interest structure including an interest matrix having a plurality of entries, wherein each of the plurality of entries comprises a non-zero number corresponding to a macroblock, and none of the plurality of entries takes on a zero value;

the bit rate control system including a sequence of macroblocks input operable to receive a sequence of macroblocks including the macroblock, and an output coupled to a video encoder operable to provide an encoded video output; and a region of interest identification system communicatively coupled to the bit rate control system, the region of interest identification system including a user input operable to receive one or more user inputs that identify a region of interest in a real time video communication generated from the encoded video output, the regional of interest identification system including an input to receive the transmitted encoded video, and an output coupled to the bit rate control system, wherein the output is operable to provide a region of interest information to the bit rate control system based on the one or more user inputs, wherein the bit rate control system is operable to determine a value for at least one of the plurality of entries based on the region of interest information.

7. The system of claim 6, wherein the region of interest identification system includes an interactive user display.

* * * * *